Oct. 27, 1964  C. A. R. KELLER ET AL  3,153,885
CYLINDRICAL CUTTER DEVICE
Filed Oct. 9, 1961
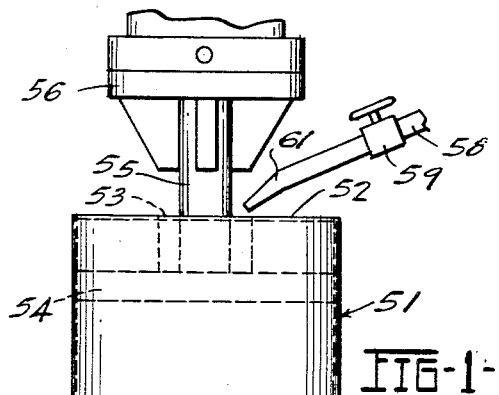
FIG-1-
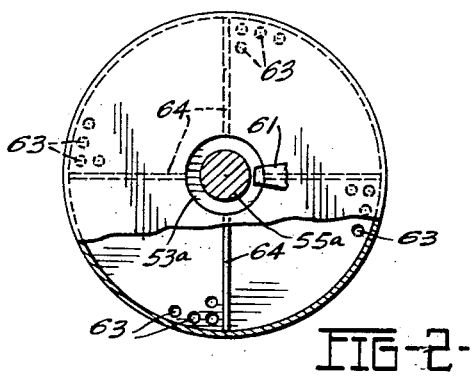
FIG-2-
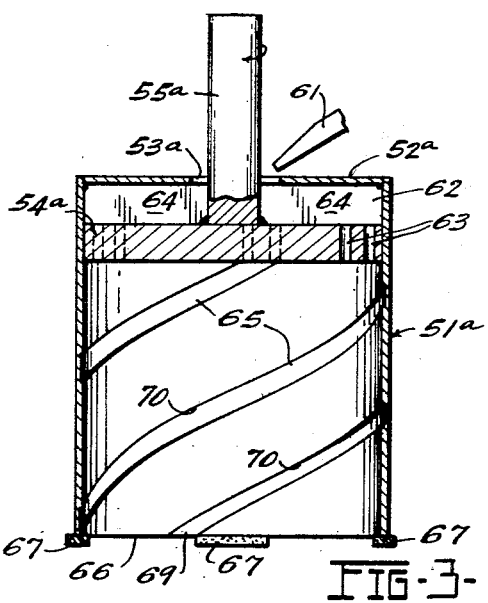
FIG-3-
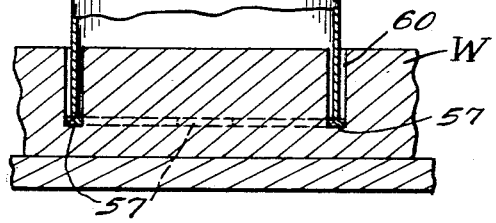
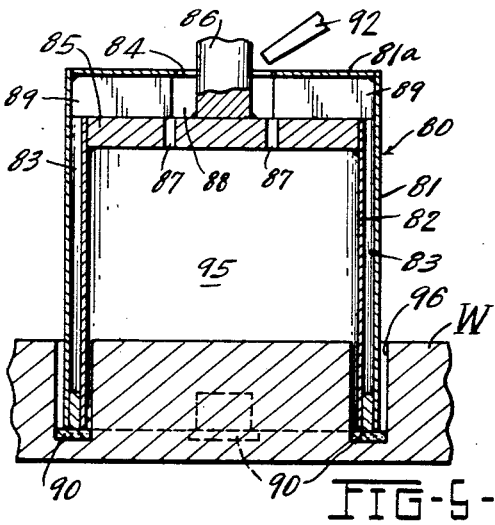
FIG-5-
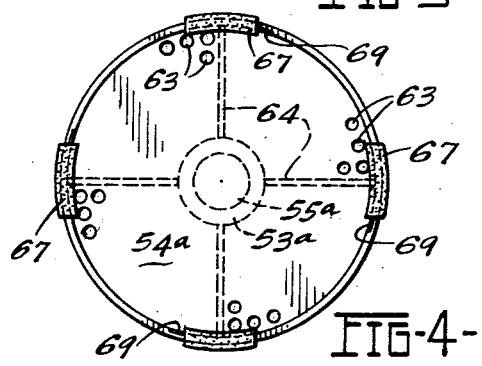
FIG-4-
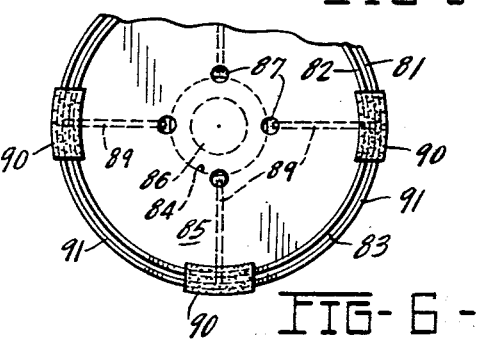
FIG-6-
INVENTORS:
CHAUNCEY A. R. KELLER,
LOWELL E. STATLER
BY
ATTORNEY

United States Patent Office 3,153,885
Patented Oct. 27, 1964

3,153,885
CYLINDRICAL CUTTER DEVICE
Chauncey A. R. Keller, Clyde, Ohio (3150 E. 45th St., Cleveland, Ohio) and Lowell E. Statler, Clyde, Ohio (126 Carol Ave., Bellevue, Ohio)
Filed Oct. 9, 1961, Ser. No. 143,730
8 Claims. (Cl. 51—267)

The present invention relates to the art of performing a cutting, sawing, or abrading operation. More particularly the present invention relates to a novel tool designed to permit the foregoing operations to be accomplished in a more expeditious manner than has been possible heretofore.

It is of course known that in any cutting, sawing, drilling or abrading operation where the work piece to be worked on is of extremely hard material that considerable work must be expended. Illustrative of such extremely hard materials are the various steel alloys utilizing such alloying elements as nickel, beryllium, chromium, manganese, boron, titanium, and the like. Further illustrative are the refractory materials such as glass, ceramics and similar materials, one of which is marketed under the tradename "Corhart." Furthermore, in performing the indicated operations on such materials, rather tremendous amounts of heat are built up. Usually in working on such materials it is necessary to employ diamond tools. By a diamond tool we mean a tool which is composed of a heat resistant matrix having imbedded therein chips or granules of industrial or natural diamonds. The so-called diamond tools are also employed in the cutting, drilling, boring or abrading of such materials as construction slate, marble, stone, refractory blocks, glass, etc. and articles formed thereof—walls, blocks, pipes, etc. The attendance of heat is very undesirable since it has several effects. It can cause discoloration of the work piece. It can cause a removal of the temper or heat treatment which has been given to the work piece or the tool. The heat can also cause an overheating of the cutting element, that is the diamond tool, such that it itself disintegrates or fuses, usually due to the destruction of the matrix portions. When this occurs, of course, the cutting, drilling, boring or abrading must be terminated so that the tool can be replaced by a fresh one.

Interruption of the cutting operation can also occur when the material of construction or work piece is ground by the action of the tool into extremely fine particulate pieces, which become jammed between the tool and the work piece, preventing effective coolant flow rather than being removed from the area being cut.

Heretofore it has been necessary to direct a stream of some compatible coolant directly onto the work piece. This is usually done by playing the stream of compatible fluid through a nozzle of restricted orifice whereby considerable fluid pressure is brought to bear upon the work piece. This entails a considerable amount of splattering, with attendant problems to the operator as well as interruption of work proceeding at an adjoining area. By a compatible liquid, we mean one which would not be injurious either to the work piece or to the abrasive element.

In this description, the abrasive element will be frequently referred to as a diamond tool. We in general do not intend to be so limited, however, since a tool in accordance with the present invention envisions the employment of various and sundry abrasive elements other than the so-called diamond tools.

Another disadvantage which is attendant the nozzle-spraying of a fluid onto the tool and work piece area, is that the fine bits of work piece are themselves deflected frequently by reason of the force induced by the stream of fluid with possible attendant injury to the operator and others located nearby.

There have also been employed a scheme for overcoming the heating problem enumerated herein above which envisions submerging the work piece and the tool in a bath of a cooling medium. This of course is not entirely satisfactory since the operator cannot conveniently see the contact of the tool head with the work piece whereby accuracy suffers. Furthermore, the tool in this event must also usually be modified by including various complicated and cumbersome shielding members which increases the ultimate cost of the operation. The latter also suffers the disadvantage that it has been found to not satisfactorily remove the fine bits of work piece removed by the tool. Another disadvantage of the bath cooling arrangement is that it does not provide for sufficient circulation of coolant whereby lowering of the temperature is accomplished sufficient to avoid deleterious effects on the tool itself or the work piece.

Accordingly, it is the object of the present invention to provide cutting, boring, drilling, sawing and the like tool devices which overcome the foregoing problems and at the same time provide a tool which is of relatively simple, though novel construction embodying various advantageous features.

It is yet another object of the present invention to provide a tool for the indicated purposes which tool includes integral therewith construction features embodying a cooling function.

It is yet another object of the present invention to provide a novel tool holder element which embodies a self-contained coolant-providing and delivering feature which is located interiorally with respect to the holder element whereby splashing and spraying is held to a minimum.

It is yet another object of the present invention to provide such a tool in which the fluid coolant can be conveniently introduced without employment of special nozzles having constrictive orifices and the like thereby eliminating entirely or reducing the splashing and spraying of the coolant fluid.

It is yet another object of the present invention to provide a tool as described hereinabove wherein the coolant of fluid character can effectively serve a dual function; namely, a cooling function and a waste-material-removal function, both of which are accomplished more efficiently than tools known heretofore.

The foregoing and other objects of the present invention will become apparent to those skilled in the art from the following detailed description taken in conjunction with the annexed sheets of drawings on which there are presented for purposes of illustration only, several preferred embodiments of the invention.

In the drawings:

FIG. 1 is a side elevation view with portions broken away of another general embodiment of a tool provided in accordance with the present invention.

FIG. 2 is a top plan view of the tool shown in FIG. 3.

FIG. 3 is a side elevation view partly in section, of another cutting tool similar to that illustrated in FIG. 1 but being illustrated in more detail and constituting a core drill adapted for drilling holes in a work piece.

FIG. 4 is a bottom plan view looking at the core drill type of tool shown in FIG. 3.

FIG. 5 is a side sectional view of a tool representing another embodiment of the present invention generally similar to the core drill type tools shown in general in FIG. 1 and in more detail in FIG. 3.

FIG. 6 is a bottom plan view of the tool shown in FIG. 5.

The cutting, drilling, boring or abrading device in accordance with the present invention is composed basically of a holder or a carrier element having a connection means for removable securement or attachment to a driven power source to thereby move the holder element according to a pre-selected manner, said holder or carrier element having a cutting edge formed on at least one edge thereof, and having a passageway formed in the holder or carrying element adapted to carry a fluid coolant from a point remote from the cutting edge to the cutting edge and correspondingly to the work piece and beyond.

Referring now more specifically to the drawings there is disclosed in FIGS. 1 through 6 the principal embodiment of the cutting device in accordance with this invention. The cutting devices in accordance with the principal embodiment take the form of a single or multiple wall core drilling tool. As can be seen in FIG. 1, holder element 51 is essentially a cylindrical member having one end partially closed by a wall 52 leaving a central aperture 53. The cylinder includes integral transverse wall 54 shown in dotted line in FIG. 1 which wall is shown in more detail in the other FIGS. 2 through 6. This wall 54 bears integral upstanding shaft member 55 which at its uppermost end is held in a chuck 56 which is in turn connected to a motor (not shown) for rotation of the chuck and in turn shaft 55, integral wall 54, and the holder element 51. The cylinder 51 has mounted at its lowermost edges a plurality of cutting or abrasive elements 57, which, as the cylinder revolves, abrasively contacts the work piece W whereupon circular hole 60 is drilled. As the drilling commences, coolant (not shown) is introduced through conduit 58, valve 59 and nozzle 61 to enter the device 51 through the aperture 53 proximate the shaft 55. As will be more apparent in the description of the succeeding figures the coolant will proceed from this point which is remote from the cutting edges interiorally downwardly into contact with the cutting edges and the contact surface between the cutting edges and the work piece.

In FIG. 3 the device 51a constitutes a single wall cylinder having a top wall 52a having a central aperture 53a. It contains an upper transverse partition 54a to which is secured an upstanding shaft 55a which is rotated by a motor as described in connection with FIG. 1 but not shown in the present FIG. 3. Coolant can be introduced through the nozzle 61 to flow into the aperture 53a and into the reservoir compartment 62 between the top wall 52a and the partition 54a. The wall 54a is provided with a plurality of rather small holes 63. The compartment 62 above partition 54a also contains a plurality, in this case 4 upstanding vane, impeller or baffle elements 64 (FIG. 2), which are at right angles to each other as shown in FIGS. 4 and 2. The holes 63 are located in close proximity to the vane, impeller or baffle elements 64 and to the periphery, as shown in FIGS. 2 and 4. This preferred construction provides efficient drainage for coolant introduced into the chamber 62 by reason of the fact that the revolution, as shown for example in FIG. 2, will cause the water to be collected (by action of centrifugal force) proximate the baffles and the intersection thereof with the outer cylindrical wall 51a. The holes 63 in the partition member 54a communicate preferably with a plurality of helical shaped grooves 65 which proceed at an angle down the side wall to terminate near the lower edge 66 of the drill device 51a. These grooves serve to carry the water downwardly by a combination of centrifugal force caused by rotation and gravity. Most preferably the helically shaped grooves proceed downwardly to describe an angle of about 45° with the vertical. The bottom edge 66 is provided with as shown a plurality of abrasive elements 67. The grooves 64 are preferably so "scored" in the inner surface of the cylinder 51a that they terminate at a portion just ahead of the rotational circular path of the abrasive elements 67. One termination point is identified by the reference numeral 69 in FIG. 3. As can be seen coolant flowing into the top wall aperture 53a will flow down onto the partition 54a and be thrown outwardly by centrifugal force and the vane or baffle members 64. Hence the coolant will pass urgingly downward through the holes 63 into the grooves 65 and thus pass in helical fashion downwardly to a point just forward of the abrasive elements. It may be noted that the direction and curvature of the helical groove 65 may vary, preferably they should however be such that the coolant is urged by the edges 70 of the groove both downwardly and radially therealong. Under particular conditions the groove 65 may be in the form of a complete and continuous slot in the cylindrical wall of the device 51a. In such case the coolant, in this case water will be urged by the edges of the slot in a downward direction to a point proximate the cutting or abrasive elements 67.

FIGS. 5 and 6 illustrate a drilling type tool device 80 which is generally similar to that shown in FIGS. 2, 3 and 4. It differs principally in the fact that it is a double wall construction. Thus it is formed of an outer cylinder member 81 and a nested inner cylinder member 82. These are spaced slightly apart to define a space 83. The outer cylinder 81 is provided with a top wall 81a which has a central aperture 84. The inner cylinder 82 likewise has a top wall 85 which spans the distance between the wall of the cylinder 82 and has attached thereto an upstanding central shaft 86 which may be connected to a source of rotation power (not shown) but similar to that shown in FIG. 1. The top wall 85 of inner cylinder 82 may be provided with apertures 87 usually located at the quadrant position as shown in FIG. 6, serving a purpose described hereinafter. The top wall 85 of cylinder 82 is spaced downward from the wall 81a of outer cylinder 81 to define therebetween a chamber 88 which communicates with the space 83 between the side walls of the cylinders 81 and 82. This chamber 88 also contains a plurality of baffle elements 89 which are secured to the bottom and top walls 85 and 81a respectively, whereupon they move as the unit is so moved. The lowermost edges of the cylinder members 81 and 82 have secured thereto a plurality of abrasive elements 90 as shown in FIGS. 5 and 6. The abrasive elements 90, of which there are four illustrated in FIG. 6, are spaced apart at the quadrant position leaving between them an arcuate portion 91 representing the lower edge of the unit 80. This arcuate portion includes arcuate space 83 between the outer and inner cylinders 81 and 82 respectively. A nozzle 92 is located near the aperture 84 and is adapted to issue coolant fluid down into the upper chamber 88 whereupon the rotating vanes or baffles 89 urge the fluid to the periphery and down into space 83 between outer and inner cylinders 81 and 82 respectively. Thence the fluid passes into proximity with the abrasive elements 90 and cools them. In addition, the fluid coolant passes between the voids 91 separating the abrasive elements and into contact with the work piece W cooling same. At the same time, of course, and in accordance with a preferred function of the device of the invention, waste material in the form of chips, granules or the like is removed from the situs of the cutting operation. We have found that with the double walled type construction that the combination of the centrifugal force imparted by the rapid rotation of the unit that the pressure builds up in the upper chamber 88 and in the passageway 83, e.g. in the neighborhood of about 15 pounds per square inch or more. This pressure may cause fluid to proceed up into the inner chamber 95. In this event the fluid pressure unless relieved will exert an upward moment of force opposing the downward force of the tool. As a consequence we provide the apertures 87 (mentioned hereinbefore) in the top wall 85 of the inner cylinder 82. These apertures allow the fluid pressure build up in the chamber 95 to be relieved by a flow of the fluid coolant up into the chamber 88 whereupon the coolant is recirculated down through passageway 83 between inner and outer cylinders 82 and 81 respectively.

The abrasive elements 90 secured to the lower edges of the cylinders are of such size that they subscribe an arc slightly larger than the wall 81 constituting the outer cylinder and an arc slightly smaller than the wall 82 constituting the inner cylinder. In this fashion there is left a void 96 through which the coolant fluid may proceed in leaving the contact area between the abrasive element and the work piece. This also serves as a passageway for removal of waste particles of the work piece formed in the drilling operation.

The foregoing represents the preferred construction in accordance with the tool devices of the present invention and while not particularly described with respect to each embodiment of the present invention the feature of having the abrasive element slightly larger than the main wall in which the element is mounted is also employed in the other tool devices in accordance with this invention.

From the foregoing description it can be seen that we have provided a novel cutting, boring, drilling or abrading tool which embodies and includes an integral self-contained cooling arrangement which advantageously allows a supply of coolant to be introduced to the tool at a point remote from the actual working contact area and delivered efficiently to the actual contact area. The cooling fluid in each case is delivered to a central convenient point requiring neither a tremendous fluid pressure nor accuracy in aiming the supply of coolant. The carrier or holder takes over at this point and urges by a pumping action the fluid in a defined manner depending upon a combination of centrifugal force, gravity and the defined spaces or grooves in the holder or carrier to deliver the fluid to the exact point where it is needed. With the tool devices or cutting devices as provided by the present invention one utilizes less fluid than any other system known heretofore. Furthermore, the cooling fluid is utilized in a more efficient manner than any system known heretofore. The fluid not only cools the tool abrading element but at the same time by the provision of the dimension or relative dimension of the abrading element as compared to the holder or carrier element provides for flushing away of the abraded material cut from the work piece. It will also be noted that no appreciable nozzle pressure need be employed, although such could be employed. The efficient utilization of the fluid makes such pressure usually unnecessary. The action of the tool and the fluid introduced thereto serves to efficiently flush away the waste and keep the tool and work piece cool.

It will be also noted that with the features as provided herein the use of guards and shields is materially reduced.

The coolant fluid may be any of those conventionally used. As indicated hereinbefore the coolant fluid choice will depend largely upon the nature of the composition of the abrasive element and also the nature and composition of the work piece. The cooling fluid may be water, an emulsion of water and oil, oil alone or other cooling fluids which are used conventionally in the cutting, sawing or abrading operations. Under certain circumstances the fluid coolant may even by a gas rather than a liquid. Furthermore, the cooling fluid may be composed of a mixture of an auxiliary abrasive and a fluid carrier.

While in describing our invention we have made particular reference to several preferred embodiments both in the drawings and in the description, we do not intend to be solely limited thereto since other obvious expedients will suggest themselves to one skilled in the art from a reading of the foregoing disclosure. Accordingly, all such obvious expediencies and modifications in terms of construction and details of construction are to be considered within the spirit and the scope of the present invention unless specifically excluded by the language of the following claims.

We claim:

1. A hole cutting device comprised of a pair of nested cylinders, each having a common open end defining concentric edges, a plurality of abrasive or cutting elements secured on said edges spanning the space between the said walls of said nested cylinders, leaving voids therebetween and projecting slightly laterally beyond the outer edge of the outermost cylinder, said nested cylinders defining an annular chamber formed by the slightly-spaced-apart relationship, the outermost of said cylinders having a top wall opposite the said edge bearing the abrasive elements, said top wall having a central aperture therein, said innermost open-ended cylinder having a top wall spaced from the top wall of said outermost cylinder, said latter mentioned top wall of the innermost cylinder having secured thereto a central shaft projecting through the hole in the top wall of the outermost cylinder for rotational drive, said cylindrical members being secured together whereby a force applied to such shaft will rotate both members, and at least one baffle element connecting the upper walls of said containers but terminating short of the shaft, whereby a cooling fluid introduced proximate said shaft and top walls will flow outwardly between said top walls and downwardly into said annular chamber and through the voids between the abrasive elements into contact with the work piece.

2. A cutting device for cuttingly or abrasively wearing away a pre-selected portion of a work piece which comprises, a holder or carrier member formed of a generally hollow cylinder having one completely open end defined by an edge, a plurality of spaced abrasive elements secured to said edge of a size to project slightly outwardly beyond the diameter of the cylindrical holder, the other end of said cylindrical holder having a centrally located shaft secured thereto adapted to be rotated by a power source, a chamber formed in the upper portion of said cylinder opposite the open end by a partition spanning the cylinder and passageways formed in said partition proximate the periphery thereof, said cylinder holder having a plurality of grooves formed therein, and communicating with said passageways and terminating proximate said abrasion elements whereby coolant introduced into said compartment will proceed to flow in the grooves to the abrasive elements and the work piece proximate thereto.

3. A cutting device for cuttingly or abrasively wearing away a pre-selected portion of a work piece which comprises a holder or carrier member formed of a generally hollow cylinder having one substantially open end defined by an edge, said edge bearing a plurality of spaced abrasive elements secured to said edge of a size to project slightly outwardly beyond the diameter of the cylindrical holder, a shaft secured centrally to the other end of said cylinder holder adapted to be rotated by a power source, a chamber formed in the upper portion of said cylinder opposite the open end, said cylinder holder having a plurality of grooves formed therein, and communicating with said chamber and terminating proximate said abrasive elements whereby water introduced into said chamber will proceed to flow to the grooves and thence to the abrasive elements, the work piece proximate thereto, and at least one baffle member in said chamber to urge the fluid introduced into said compartment down into said grooves.

4. A cutting or abrading device comprising a holder composed of a pair of nested cylinders secured in slightly spaced relationship to define an integral annular passageway, said cylinders including spaced top walls defining an upper chamber, said cylinders having lower spaced edges in concentric relationship, said holder including an inlet remote from said spaced edges, said chamber connecting said annular passageway and said inlet, a plurality of abrasive or cutting elements carried on at least one of said edges in spaced relationship and being adapted to contact a work piece, said spaced elements defining voids therebetween communicating with said annular passageway, said holder being adapted for rotation to cause said spaced elements to repeatedly frictionally contact the work piece, and also thereby urge fluid coolant introduced into said chamber, through said inlet, towards said passageway, thence through said passageway to said voids and to said work piece, cooling same and carrying away waste from said cutting or abrading.

5. A cutting device as claimed in claim 4 wherein the abrasive or cutting elements subscribe an arc just slightly larger than the diameter of the outermost of said cylinders.

6. A device as claimed in claim 4, wherein said chamber includes at least one radial baffle to thereby accentuate the radial flow of coolant in said chamber toward said annular passageway and therebeyond.

7. A device as claimed in claim 4, wherein the top wall of the inner cylinder contains at least one central port connecting the chamber with the space therebeneath, whereby fluid pressure within said holder beneath said upper chamber is relieved and coolant returned to said chamber for recirculation through said annular passageway to said voids.

8. A cutting device comprising an axially driven cylinder having one open end defined by an annular edge, a plurality of cutting or abrasive elements mounted in said edge, the end of said cylinder opposite the open end constituting the drive end, said drive end including an integral chamber defined by two spaced walls, an inlet passageway in the outer wall proximate the axis of the cylinder, at least one passageway through the inner wall near the outer margin and at least one spirally descending groove formed on the inner surface of said cylinder, whereby coolant introduced into said chamber through said inlet passageway will be urged positively laterally therethrough and thence positively down through said passageway in said inner wall to said groove for transmission to said cutting edge.

References Cited in the file of this patent
UNITED STATES PATENTS

| | | |
|---|---|---|
| 1,737,486 | Winter | Nov. 26, 1929 |
| 2,599,770 | Marcerou | June 10, 1952 |
| 2,626,493 | Speicher | Jan. 27, 1953 |
| 2,697,878 | Oberley | Dec. 28, 1954 |
| 2,807,256 | Woolley | Sept. 24, 1957 |
| 2,830,795 | Center | Apr. 15, 1958 |
| 2,867,063 | Metzger | Jan. 6, 1959 |
| 3,003,493 | Miller | Oct. 10, 1961 |

FOREIGN PATENTS

| | | |
|---|---|---|
| 33,517 | Germany | Oct. 29, 1885 |
| 99,479 | Sweden | July 23, 1940 |
| 580,867 | Great Britain | Sept. 23, 1946 |